US012645273B2

(12) United States Patent
Ji et al.

(10) Patent No.: US 12,645,273 B2
(45) Date of Patent: Jun. 2, 2026

(54) ELECTRONIC DEVICE RESOLVING SUDDEN POWER OFF

(71) Applicant: Samsung Electronics Co., Ltd., Suwon-si (KR)

(72) Inventors: Sooyoung Ji, Suwon-si (KR); Heeseok Eun, Suwon-si (KR); Seunghan Lee, Suwon-si (KR)

(73) Assignee: Samsung Electronics Co., Ltd., Gyoenggi-do (KR)

( * ) Notice: Subject to any disclaimer, the term of this patent is extended or adjusted under 35 U.S.C. 154(b) by 96 days.

(21) Appl. No.: 18/480,948

(22) Filed: Oct. 4, 2023

(65) Prior Publication Data

US 2024/0272689 A1 Aug. 15, 2024

(30) Foreign Application Priority Data

Feb. 13, 2023 (KR) ........................ 10-2023-0018909

(51) Int. Cl.
*G06F 1/26* (2006.01)

(52) U.S. Cl.
CPC ................................... *G06F 1/263* (2013.01)

(58) Field of Classification Search
CPC ............................... G06F 1/263; G06F 3/0625
See application file for complete search history.

(56) References Cited

U.S. PATENT DOCUMENTS

| | | | |
|---|---|---|---|
| 9,311,007 B2 * | 4/2016 | Hoayun ................ G06F 3/0673 |
| 9,710,343 B2 | 7/2017 | Petersen | |

| | | | |
|---|---|---|---|
| 10,528,110 B2 | 1/2020 | Jäntti et al. | |
| 10,599,206 B2 * | 3/2020 | Cox ...................... G11C 7/1045 |
| 10,795,823 B2 * | 10/2020 | Ramanujan ......... G06F 12/0864 |
| 11,048,312 B2 * | 6/2021 | Wells ................... G06F 11/2015 |
| 11,150,714 B2 | 10/2021 | Cui et al. | |
| 11,347,593 B2 | 5/2022 | Horspool et al. | |
| 11,733,883 B2 * | 8/2023 | Kwak ................. G06F 11/3065 |
| | | | 713/320 |
| 2009/0055520 A1 * | 2/2009 | Tabata .................. G06F 1/3221 |
| | | | 713/300 |
| 2010/0332858 A1 * | 12/2010 | Trantham ................ G06F 1/263 |
| | | | 713/300 |
| 2012/0117409 A1 * | 5/2012 | Lee ........................... G06F 1/30 |
| | | | 713/340 |

(Continued)

FOREIGN PATENT DOCUMENTS

| | | | | |
|---|---|---|---|---|
| EP | 4286987 A1 * | 12/2023 | .............. G06F 1/30 |
| KR | 10-2134755 B1 | 7/2020 | |

(Continued)

*Primary Examiner* — Aurel Prifti
(74) *Attorney, Agent, or Firm* — Harness, Dickey & Pierce, P.L.C.

(57) ABSTRACT

An electronic device includes a substrate that includes a plurality of first connectors, at least one second connector, and a plurality of first wires connecting the plurality of first connectors and the at least one second connector, a plurality of storage devices connected to the plurality of first connectors, and at least one battery connected to the second connector, the at least one battery configured to, receive information related to the plurality of storage devices through the plurality of first wires, and supply auxiliary power to the plurality of storage devices based on the received information in response to a detected sudden power off (SPO) event.

20 Claims, 9 Drawing Sheets

(56)                    References Cited

U.S. PATENT DOCUMENTS

| | | | | |
|---|---|---|---|---|
| 2013/0060987 A1* | 3/2013 | Bolen | G06F 13/00 710/316 | |
| 2013/0198544 A1* | 8/2013 | Ju | G06F 1/3268 713/323 | |
| 2015/0234768 A1* | 8/2015 | Bass | G06F 13/4081 710/302 | |
| 2015/0309951 A1* | 10/2015 | Breakstone | G06F 3/0625 710/313 | |
| 2016/0011650 A1* | 1/2016 | Yang | G06F 1/263 713/323 | |
| 2016/0117125 A1* | 4/2016 | Starr | G06F 1/3268 713/310 | |
| 2016/0349817 A1* | 12/2016 | Kumar | G06F 3/0647 | |
| 2017/0060426 A1* | 3/2017 | Lee | G06F 3/0688 | |
| 2017/0060436 A1* | 3/2017 | Trika | G06F 1/3268 | |
| 2017/0228154 A1* | 8/2017 | Liu | G06F 11/1441 | |
| 2017/0262375 A1* | 9/2017 | Jenne | G06F 12/0895 | |
| 2017/0357301 A1* | 12/2017 | Chen | G06F 1/3275 | |
| 2018/0329468 A1* | 11/2018 | Nelson | G06F 11/1441 | |
| 2018/0348838 A1* | 12/2018 | Cox | G06F 1/324 | |
| 2019/0011970 A1* | 1/2019 | Youn | G06F 1/3212 | |
| 2019/0101974 A1* | 4/2019 | Guim Bernat | G06F 1/3225 | |
| 2019/0354157 A1* | 11/2019 | Cui | G06F 11/1441 | |
| 2020/0257346 A1* | 8/2020 | Wells | H02J 9/06 | |
| 2021/0135460 A1* | 5/2021 | Zhai | G06F 1/187 | |
| 2021/0165581 A1 | 6/2021 | Kwon | | |
| 2021/0191864 A1* | 6/2021 | Cho | G06F 1/3275 | |
| 2022/0155973 A1 | 5/2022 | Lim et al. | | |
| 2022/0253226 A1* | 8/2022 | He | G06F 3/0625 | |
| 2023/0096935 A1 | 3/2023 | Lee et al. | | |
| 2023/0129347 A1* | 4/2023 | Thibodeau | G01R 31/389 702/63 | |
| 2023/0384847 A1* | 11/2023 | Hur | G11C 5/148 | |

FOREIGN PATENT DOCUMENTS

| | | |
|---|---|---|
| KR | 10-2021-0069744 A | 6/2021 |
| KR | 10-2022-0053177 A | 4/2022 |
| KR | 10-2022-0066741 A | 5/2022 |
| WO | WO-2020/165645 A1 | 8/2020 |

* cited by examiner

| PP I | 1 | 2 | 3 | 4 | 5 |
|------|-----|-----|-----|-----|---|
| D I | 141 | 142 | 143 | 144 | |
| DT | V | V | V | V | |
| VTG | 3.3 | 5 | 3.3 | 5 | |
| S I | V | V | I | I | |
| T I | 1 | 1 | 2 | 2 | |

Figure 8:
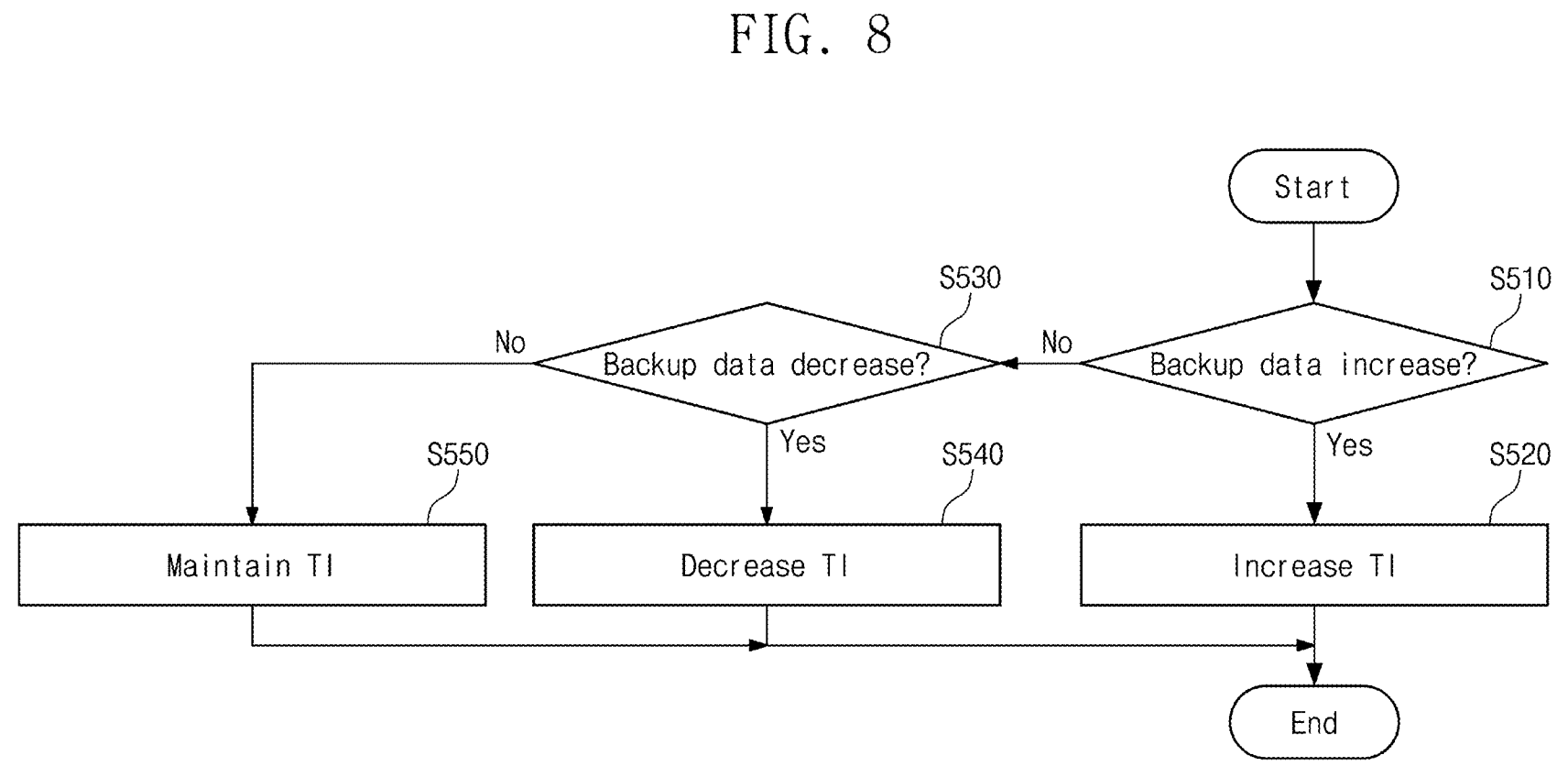

Start

S510
Backup data increase?

Yes

S520
Increase TI

No

S530
Backup data decrease?

Yes

S540
Decrease TI

No

S550
Maintain TI

End

ELECTRONIC DEVICE RESOLVING SUDDEN POWER OFF

CROSS-REFERENCE TO RELATED APPLICATION

This U.S. non-provisional application claims the benefit of priority under 35 U.S.C. § 119 to Korean Patent Application No. 10-2023-0018909 filed on Feb. 13, 2023, in the Korean Intellectual Property Office, the disclosure of which is incorporated by reference herein in its entirety.

BACKGROUND

Various example embodiments of the inventive concepts described herein relate to an electronic device, a system including the electronic device, and/or a method of operating the electronic device, etc., and more particularly, relate to an electronic device resolving sudden power off through interaction between components, a system including the electronic device, and/or a method of operating the electronic device, etc.

An electronic device operates based on a power supplied thereto. The power supplied to the electronic device may be suddenly turned off, discontinued, interrupted, etc. For example, the power supplied to the electronic device may be suddenly turned off due to power failure and/or an abnormal operation of a power supply device. A phenomenon and/or occurrence in which the power supplied to the electronic device is suddenly turned off is called sudden power off (SPO) event.

Components of the electronic device may be initialized when a power starts to be supplied thereto. Also, the electronic device may prepare the components for the power-off through a power off sequence before the power is turned off. When the power is suddenly turned off, the power off sequence is incapable of being performed. In this case, the components of the electronic device may be damaged and/or data managed in the electronic device may be lost, etc.

SUMMARY

Various example embodiments of the inventive concepts provide an electronic device which allows components of the electronic device to independently resolve a sudden power off by itself through interaction between the components, a system including the electronic device, and/or a method of operating the electronic device, etc.

According to at least one example embodiment, an electronic device includes a substrate including a plurality of first connectors, at least one second connector, and a plurality of first wires connecting the plurality of first connectors and the at least one second connector, a plurality of storage devices connected to the plurality of first connectors, and at least one battery connected to the second connector, the at least one battery configured to, receive information related to the plurality of storage devices through the plurality of first wires, and supply auxiliary power to the plurality of storage devices based on the received information in response to a detected sudden power off (SPO) event.

According to at least one example embodiment, an electronic device includes a controller including a shared register, the shared register configured to store information received from an external substrate, a battery, a plurality of power ports, and the controller is configured to supply power from the battery to the plurality of power ports based on the information stored in the shared register in response to a sudden power off (SPO) event being detected.

According to at least one example embodiment, an electronic device includes a controller including a shared register, the shared register configured to store information received from an external substrate, at least one nonvolatile memory device configured to store data received from the external substrate, at least one capacitor configured to supply a first auxiliary power to the controller and the at least one nonvolatile memory device in response to a sudden power off (SPO) event being detected, at least one power port configured to receive a second auxiliary power supplied to the controller and the at least one nonvolatile memory device in response to the SPO event being detected, and the controller is configured to adjust the second auxiliary power received through the at least one power port by transmitting information through the external substrate.

BRIEF DESCRIPTION OF THE FIGURES

The above and other objects and features of one or more example embodiments of the inventive concepts will become apparent by describing in detail various example embodiments thereof with reference to the accompanying drawings.

FIG. 7 illustrates an example of a method in which a battery module identifies a first storage device and a second storage device according to at least one example embodiment.

FIG. 8 illustrates an example in which one of first to fourth storage devices adjusts time information according to at least one example embodiment.

DETAILED DESCRIPTION

Below, various example embodiments of the inventive concepts will be described in detail and clearly to such an extent that an ordinary one in the art easily carries out one or more example embodiments of the inventive concepts.

Figure 1:
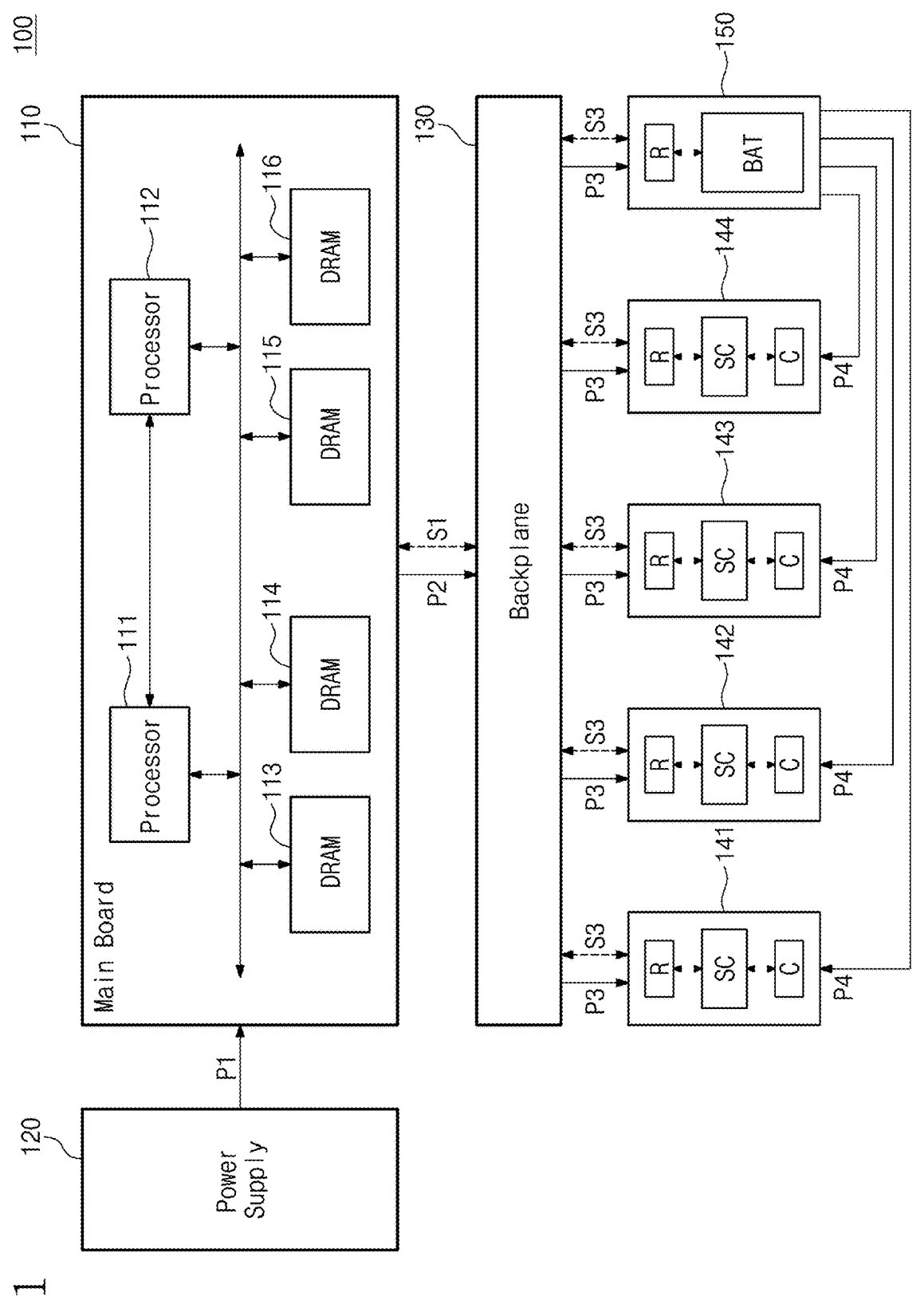
FIG. 1 illustrates an electronic device according to at least one example embodiment of the inventive concepts.

FIG. 1 illustrates an electronic device 100 according to at least one example embodiment of the inventive concepts. Referring to FIG. 1, the electronic device 100 may include a main board 110, a power supply 120, a backplane 130, a plurality of storage devices 141 to 144, and/or a battery module (e.g., battery, battery device, battery circuit, etc.) 150, etc., but the example embodiments are not limited thereto, and for example, the example embodiments may include a greater or lesser number of constituent components, etc.

Principle components of the electronic device 100 may be mounted on the main board 110. For example, a plurality of processors, e.g., a first processor 111 and a second processor 112 (e.g., processing circuitry, etc.), etc., and a plurality of dynamic random access memories (DRAMs), e.g., a first to fourth DRAMs 113 to 116, etc.) may be mounted on the main board 110, but the example embodiments are not limited thereto. While FIG. 1 illustrates two processors and four DRAMs, the example embodiments are not limited thereto, and for example, the electronic device 100 may include a greater or lesser number of processors, a greater or lesser number of DRAMs, and/or may include other components, etc.

In at least one example embodiment, the first processor 111 may include a central processing unit CPU, but is not limited thereto. The central processing unit CPU may include one or more cores operating independently of each other and/or in connection therewith. The first processor 111 may include various accelerators (and/or acceleration processors, etc.), which are configured to perform unique operations, such as a graphics processing unit (GPU), a digital signal processor (DSP), an image signal processor (ISP), and/or a neural processing unit (NPU), etc. The accelerators (and/or acceleration processors, etc.) may be integrated in one semiconductor package as a plurality of cores together with the central processing unit CPU so as to be mounted on the main board 110 and/or may be mounted on the main board 110 as two or more separate semiconductor packages separated from each other, etc.

The second processor 112 may include an infrastructure processing unit (IPU), but is not limited thereto. The second processor 112 may be configured to perform operations, which are relatively low in complexity and/or desire and/or require a relatively great clock cycle, from among operations that have been performed by the central processing unit CPU. For example, the second processor 112 may be configured to perform virtual switching, security, and/or data access (e.g., write, read, and/or erase, etc.), but is not limited thereto.

The first to fourth dynamic random access memories 113 to 116, etc., may be used as a main memory of the electronic device 100, bur are not limited thereto. The first to fourth dynamic random access memories 113 to 116, etc., may be used by the first processor 111 and/or the second processor 112, etc., for at least one of various purposes, such as a system memory, a working memory, a buffer memory, and/or a data memory, etc.

The power supply 120 may receive power from an external device and/or an external source and may supply a first power P1 including one or more voltages and one or more currents appropriate for the electronic device 100 and/or components of the electronic device 100 to the main board 110. The first processor 111, the second processor 112, and the first to fourth dynamic random access memories 113 to 116 mounted on the main board 110 may operate based on the first power P1, but the example embodiments are not limited thereto.

The backplane 130 may be configured such that a plurality of electronic devices are mounted thereon and may include a separate substrate separated from the main board 110. For example, the backplane 130 may include a plurality of connectors and may provide at least one channel between the main board 110 and/or a plurality of components connected to the plurality of connectors, etc.

For example, the main board 110 may supply a second power P2 to the backplane 130, but is not limited thereto. The main board 110 may exchange at least one first signals S1 with the backplane 130, etc. For example, the first signals S1 may include a signal(s) that the first processor 111 and/or the second processor 112 communicates (e.g., transmits and/or receives) with one or more components mounted on the backplane 130, etc.

In at least one example embodiment, the first to fourth storage devices 141 to 144 (and/or other devices) and the battery module 150 (e.g., battery, battery device, battery circuit, etc.) may be mounted on the backplane 130, but are not limited thereto. The backplane 130 may supply a third power P3 to the first to fourth storage devices 141 to 144 and/or the battery module 150, but is not limited thereto. The backplane 130 may communicate at least one third signal S3 with the first to fourth storage devices 141 to 144 and/or the battery module 150, etc. For example, the third signal S3 may include at least one signal(s) that the first processor 111 and/or the second processor 112 communicates with the one or more components mounted on the backplane 130 and/or at least one signal(s) that the one or more components mounted on the backplane 130 communicate with each other, etc.

The first to fourth storage devices 141 to 144 may be solid state drives (SSDs), but are not limited thereto, and for example, one or more of the first to fourth storage devices may be a disk drive, etc. Each of the first to fourth storage devices 141 to 144 may include a shared register "R", a storage circuit SC, and/or at least one capacitor "C", etc. The shared register "R" may be used based on a communication protocol that is used for the first to fourth storage devices 141 to 144 to communicate with the first processor 111 and/or the second processor 112, etc. For example, each of the first to fourth storage devices 141 to 144 may be configured to communicate with the first processor 111 and/or the second processor 112 based on PCIe (Peripheral Component Interconnect express) and/or NVMe (NonVolatile Memory express) protocols, but are not limited thereto. The shared register "R" may include a base address register (BAR) among registers defined in the PCIe protocol and/or NVMe protocol, etc.

The storage circuit "SC" may be used for each of the first to fourth storage devices 141 to 144 to write data writerequested by the first processor 111 and/or the second processor 112. Each of the first to fourth storage devices 141 to 144 may read data read-requested by the first processor 111 and/or the second processor 112 from the storage circuit SC and may provide the read data to the first processor 111 and/or the second processor 112, etc.

The at least one capacitor "C" may be used to provide an auxiliary power to each of the first to fourth storage devices 141 to 144. For example, the capacitor "C" of each of the first to fourth storage devices 141 to 144 may be charged by using the third power P3, but is not limited thereto. When a sudden power off (SPO) event occurs in the electronic device 100, the capacitor "C" may provide a first auxiliary power to each of the first to fourth storage devices 141 to 144, etc. Each of the first to fourth storage devices 141 to 144 may perform the power off sequence based on the first auxiliary power of the capacitor "C". In at least one example embodiment, the capacitor "C" may be replaced with any other element capable of charging and providing power (e.g., energy, electricity, etc.).

In at least one example embodiment, the description is given as each of the first to fourth storage devices 141 to 144 includes the capacitor "C", but at least one of the first to fourth storage devices 141 to 144 may not include the capacitor "C". Additionally, the capacitor "C" of at least one of the first to fourth storage devices 141 to 144 may be in a state of being damaged. The first auxiliary power of a storage device that does not include the capacitor "C" or includes the damaged capacitor "C" may not exist or may be insufficient.

The battery module 150 may supply a fourth power P4 to the first to fourth storage devices 141 to 144, etc. The fourth power P4 may be supplied to the first to fourth storage devices 141 to 144 as a second auxiliary power. In at least one example embodiment, the third power P3 may be supplied to the first to fourth storage devices 141 to 144 through power wires (e.g., power circuitry, power wiring, power connections, etc.) in the backplane 130, but is not limited thereto. The fourth power P4 may be supplied to the first to fourth storage devices 141 to 144 through separate power wires (e.g., power circuitry, power wiring, power connections, etc.) that are distinguished from those of the backplane 130, etc.

The battery module 150 may include a shared register "R" and a battery BAT. The shared register "R" may be used based on a communication protocol that is used for the battery module 150 to communicate with the first processor 111, the second processor 112, and/or the first to fourth storage devices 141 to 144, etc. For example, the battery module 150 may be configured to communicate with the first processor 111, the second processor 112, and/or the first to fourth storage devices 141 to 144, etc., based on the PCIe and/or NVMe protocols, etc. The shared register "R" may include a BAR among the registers defined in the PCIe protocol and/or NVMe protocol, etc.

The battery BAT may be charged by the third power P3 supplied from the backplane 130, but is not limited thereto. When the sudden power off (SPO) event occurs in the electronic device 100, the battery module 150 may provide the second auxiliary power to the first to fourth storage devices 141 to 144, etc. Each of the first to fourth storage devices 141 to 144 may perform the power off sequence based on and/or using the second auxiliary power, etc.

Each of the first to fourth storage devices 141 to 144 may record information of the desired and/or necessary second auxiliary power at the shared register "R" of the battery module 150 through the backplane 130. The battery module 150 may supply the second auxiliary power to the first to fourth storage devices 141 to 144 based on the information stored in the shared register "R". That is, the first to fourth storage devices 141 to 144 and the battery module 150 may prepare for the sudden power off SPO by interacting through the backplane 130, etc.

In at least one example embodiment, the components of FIG. 1 are described by using the terms "storage device" and "battery module", but each of the first to fourth storage devices 141 to 144 and the battery module 150 may be an electronic device that operates as a sub-component of the electronic device 100, etc.

In at least one example embodiment, the description is given as the battery module 150 supplies the second auxiliary power to the first to fourth storage devices 141 to 144 through the independent power wires separated from the power wires of the backplane 130. However, the example embodiments are not limited thereto, and for example, the battery module 150 may be configured to supply the second auxiliary power to the first to fourth storage devices 141 to

144 through the power wires of the backplane 130, not the independent power wires, etc.

Figure 2:
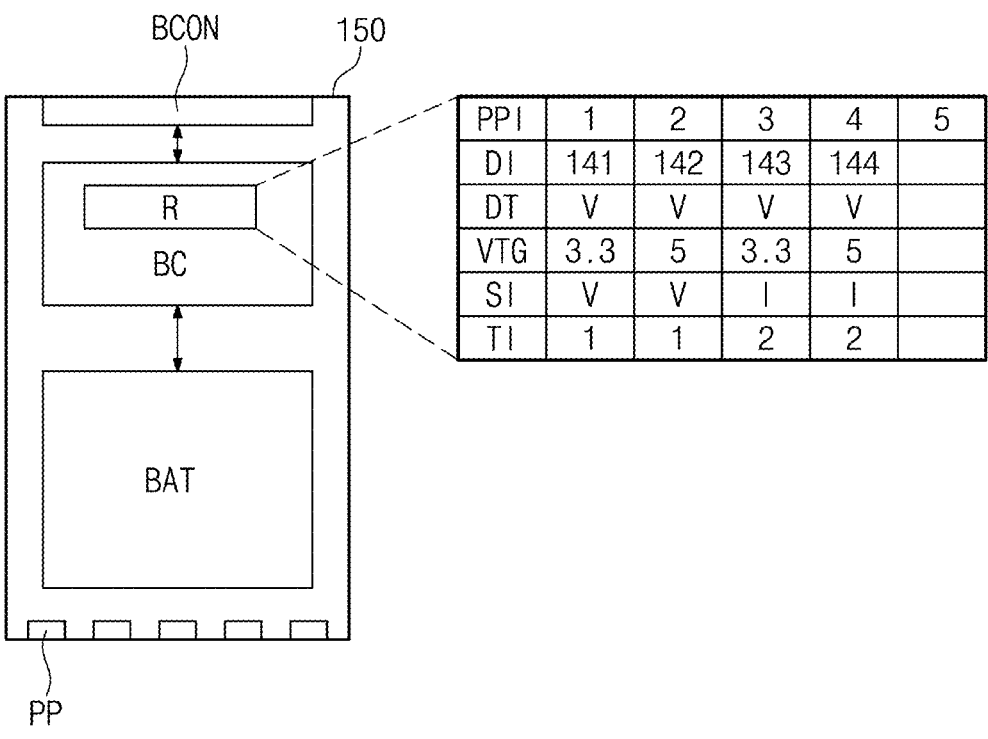
FIG. 2 illustrates a battery module according to at least one example embodiment of the inventive concepts.

FIG. 2 illustrates the battery module 150 according to at least one example embodiment of the inventive concepts. Referring to FIGS. 1 and 2, the battery module 150 may include a battery connector BCON, a battery controller BC, the battery BAT, and/or power ports PP, etc.

The battery connector BCON may be configured to be connected to the backplane 130. For example, the battery connector BCON may be implemented based on the PCIe protocol, but is not limited thereto. The battery connector BCON may receive the third power P3 from the backplane 130 and may exchange the third signal S3 with the backplane 130, etc.

The battery controller BC may control overall operations of the battery module 150. The battery controller BC may include the shared register "R", but the example embodiments are not limited thereto. The battery controller BC may store information related to the plurality of storage devices, e.g., the first to fourth storage devices 141 to 144, and/or other components and/or devices (not shown) connected to the backplane 130, etc., received from the backplane 130 through the battery connector BCON. For example, the information related to the second auxiliary power may be stored in the shared register "R", but the example embodiments are not limited thereto. According to some example embodiments, the battery controller BC may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The battery controller BC may operate based on the third power P3 received from the backplane 130 through the battery connector BCON. The battery controller BC may charge the battery BAT based on the third power P3 received from the backplane 130 through the battery connector BCON. The battery controller BC may output the fourth power P4 through at least some of the plurality of power ports PP by using the third power P3 received from the backplane 130 through the battery connector BCON and/or the power charged in the battery BAT.

The battery controller BC may store information corresponding to the plurality of power ports PP in the shared register "R". For example, power port identifiers PPI of, e.g., "1", "2", "3", "4", and "5", may be respectively assigned to five power ports, but the example embodiments are not limited thereto, and there may be a greater or lesser number of power ports and power port identifiers, etc. For example, the power port identifier PPI may be a power port number, may be a pointer, a field number, and/or an address pointing out and/or indicating a space of the shared register "R", in which information corresponding to each of the power ports PP is stored, etc.

Through the initialization operation of the battery module 150, the battery controller BC may determine whether devices that are connected to the backplane 130 are connected to any power ports among the plurality of power ports PP. For example, the battery controller BC may determine whether the first to fourth storage devices 141 to 144 that are connected to the backplane 130 are connected to any power ports among the plurality of power ports PP, etc. The battery controller BC may allocate device identifiers DI of the first to fourth storage devices 141 to 144 to the power ports PP depending on the results of the determination.

For example, the device identifiers DI may be a pointer, a field number, and/or an address, etc., pointing out and/or indicating a space of the shared register "R", in which information corresponding to a device of the device identifier DI is stored. In at least one example embodiment, a storage space of the shared register "R", which is allocated to store information corresponding to the power port identifier PPI of "5", the storage device of which is not connected, may be empty.

When a device which is not a storage device is connected to the backplane 130 and the power port PP of "5", the battery controller BC may also identify the device connected to the power port PP as "5". For example, the battery controller BC may store an identifier of the device connected to the power port PP of "5" in the space storing the device identifier corresponding to the power port PP of "5", etc.

The battery controller BC may record device type information DT of the devices that are connected to the backplane 130 and are connected to the power ports PP at the shared register "R" based on at least one signal (and/or information) received from the backplane 130 through the battery connector BCON. For example, the battery controller BC may receive and/or record the device type information DT of the first to fourth storage devices 141 to 144, which are connected to the backplane 130 and are connected to the power ports PP at the shared register "R", but the example embodiments are not limited thereto.

For example, the device type information DT may indicate whether a device type of each of the first to fourth storage devices 141 to 144 is a device type where the second auxiliary power is desired and/or required. In at least one example embodiment, a device that performs the power off sequence may desire and/or require the second auxiliary power, and a device that does not perform the power off sequence may not desire and/or require the second auxiliary power, etc., but the example embodiments are not limited thereto.

The device type information DT of the first to fourth storage devices 141 to 144, each of which has a device type where the second auxiliary power is desired and/or required, may be set to a valid value "V". The device type information DT of a device having a type where the second auxiliary power is not desired and/or required may be set to an invalid value "I".

When a device that does not perform the power off sequence is connected to the backplane 130 and the power port PP of "5", the battery controller BC may record the device type information DT of the device connected to the power port PP of "5" so as to be set to the invalid value (e.g., "I"), etc.

In at least one example embodiment, each of the first to fourth storage devices 141 to 144 may provide the device type information DT to the battery module 150 through the backplane 130, but the example embodiments are not limited thereto. As another example, the first processor 111 and/or the second processor 112 may collect information of and/or associated with components connected to the backplane 130 (e.g., during the initialization operation, from a device driver associated with the device, from an operating system executing on the first processor 111 and/or the second processor 112, etc.) and may provide the device type information DT of the components (e.g., the first to fourth storage devices 141 to 144, etc.) to the battery module 150 through the backplane 130, etc.

Based on a signal (and/or information) received from the backplane 130 through the battery connector BCON, the battery controller BC may record voltage level information VTG associated with and/or corresponding to the devices which are connected to the backplane 130 and are connected to the power ports PP, for example, the first to fourth storage devices 141 to 144, etc., in the shared register "R". For example, the voltage level information VTG may indicate a voltage level that each of the first to fourth storage devices 141 to 144 desires and/or requires as the second auxiliary power, but is not limited thereto.

For example, the voltage level information VTG of the first and third storage devices 141 and 143, which are configured to perform a storage function, from among the first to fourth storage devices 141 to 144 may indicate a relatively low voltage level, for example, 3.3 V, but are not limited thereto. The voltage level information VTG of the second and fourth storage devices 142 and 144, which are configured to perform an additional function, for example, computation such as compare and/or sorting, in addition to the storage function may indicate a relatively high voltage level, for example, 5 V, but are not limited thereto.

When a device connected to the backplane 130 and the power port PP of "5" does not desire and/or require the second auxiliary power, the battery controller BC may make the voltage level information VTG corresponding to the power port PP of "5" empty (e.g., have a null value, etc.) or may record a specific value, which indicates that the second auxiliary power is not desired and/or required as status information SI corresponding to the power port PP of "5", etc.

In at least one example embodiment, each of the first to fourth storage devices 141 to 144 may provide the voltage level information VTG to the battery module 150 through the backplane 130. As another example, the first processor 111 and/or the second processor 112 collects information associated with and/or corresponding to components connected to the backplane 130 (e.g., during the initialization operation, from a device driver associated with the device, from an operating system executing on the first processor 111 and/or the second processor 112, etc.) may provide the voltage level information VTG of the components (e.g., the first to fourth storage devices 141 to 144, etc.) to the battery module 150 through the backplane 130.

Based on at least one signal (and/or information) received from the backplane 130 through the battery connector BCON, the battery controller BC may record the status information SI of devices that are connected to the backplane 130 and are connected to the power ports PP, for example, the first to fourth storage devices 141 to 144, etc., which are connected to the backplane 130 and are connected to the power ports PP, in the shared register "R". For example, the status information SI may include information related to a state of each of the first to fourth storage devices 141 to 144, information related to a state of the capacitor "C", and/or a state of the first auxiliary power (e.g., an internal auxiliary power) supplied by the capacitor "C", etc.

The first auxiliary power of a storage device, which does not include the capacitor "C" or includes a damaged capacitor "C", from among the first to fourth storage devices 141 to 144 may be less than a power desired and/or necessary for performing the power off sequence of the respective storage device. The battery controller BC may record the status information SI of the first and second storage devices, which are assumed to provide first auxiliary power which is sufficient to perform the power off sequence of the first and second storage devices, respectively, at the shared register "R" as the valid value "V". The battery controller BC may record the status information SI of the third and fourth storage devices, which are assumed to not provide sufficient first auxiliary power to perform the power off sequence at the shared register "R" as the invalid value "I".

When a device connected to the backplane 130 and the power port PP of "5" does not desire and/or require the second auxiliary power, the battery controller BC may make the status information SI corresponding to the power port PP of "5" empty or may record a specific value which indicates that the second auxiliary power is not desired and/or required as the status information SI corresponding to the power port PP of "5", etc.

In at least one example embodiment, each of the first to fourth storage devices 141 to 144 may provide the status information SI to the battery module 150 through the backplane 130, but the example embodiments are not limited thereto. As another example, the first processor 111 and/or the second processor 112 collects information related to and/or collects information from the components connected to the backplane 130 (e.g., during the initialization operation, from a device driver, from the operating system, etc.) and may provide the status information SI of the components (e.g., the first to fourth storage devices 141 to 144, etc.) to the battery module 150 through the backplane 130. When the status information SI is updated, each of the first to fourth storage devices 141 to 144 may provide the status information SI to the battery module 150 through the backplane 130, etc., but the example embodiments are not limited thereto.

Based on at least one signal (and/or information) received from the backplane 130 through the battery connector BCON, the battery controller BC may record time information TI in the shared register "R" of the devices that are connected to the backplane 130 and are connected to the power ports PP, for example, the first to fourth storage devices 141 to 144, etc., that are connected to the backplane 130 and are connected to the power ports PP. For example, the time information TI may refer to information related to a time to supply the second auxiliary power that each of the first to fourth storage devices 141 to 144 desires and/or requires.

For example, the time information TI may indicate a time to supply the second auxiliary power for the purpose of performing the power off sequence when the sudden power off (SPO) event occurs in the electronic device 100, but is not limited thereto. The time information TI may indicate a ratio of a time value and/or a default time value.

For example, the battery controller BC may record a value of "1" as the time information TI of the first and second storage devices 141 and 142, etc. For example, the battery controller BC may record a value of "2" as the time information TI of the third and fourth storage devices 143 and 144, etc.

When a device connected to the backplane 130 and the power port PP of "5" does not desire and/or require the second auxiliary power, the battery controller BC may make the time information TI corresponding to the power port PP of "5" empty or may record a specific value which indicates that the second auxiliary power is not desired and/or required, as the time information TI corresponding to the power port PP of "5".

In at least one example embodiment, each of the first to fourth storage devices 141 to 144 may provide the time information TI to the battery module 150 through the backplane 130. As another example, the first processor 111 and/or the second processor 112 that collects information of components connected to the backplane 130 (e.g., during the initialization operation, from a device driver, from an operating system, etc.) may provide the time information TI of the components (e.g., the first to fourth storage devices 141 to 144) to the battery module 150 through the backplane 130, etc. When the time information TI is updated, each of the first to fourth storage devices 141 to 144 may provide the time information TI to the battery module 150 through the backplane 130, but are not limited thereto.

Figure 3:
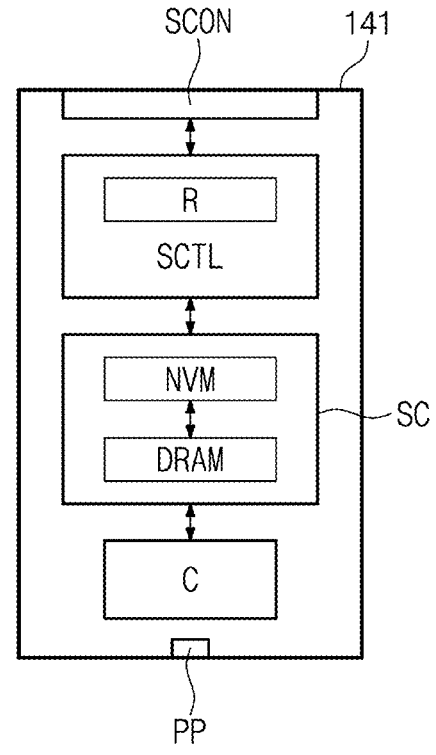
FIG. 3 illustrates a first storage device according to at least one example embodiment of the inventive concepts.

FIG. 3 illustrates the first storage device 141 according to at least one example embodiment of the inventive concepts. In at least one example embodiment, the second to fourth storage devices 142 to 144 may include components the same as, or similar to, those of the first storage device 141 and may operate to be the same as, or similar to, the first storage device 141, but the example embodiments are not limited thereto. Thus, additional description associated with the second to fourth storage devices 142 to 144 will be omitted to avoid redundancy.

Referring to FIGS. 1, 2, and 3, the first storage device 141 may include a storage connector SCON, a storage controller SCTL, the storage circuit SC, the capacitor "C", and/or a power port PP, etc., but the example embodiments are not limited thereto. According to some example embodiments, the storage controller SCTL, the storage circuit SC, the capacitor "C", etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The storage connector SCON may be configured to be connected to the backplane 130. For example, the storage connector SCON may be implemented based on the PCIe protocol and/or the NVMe protocol, etc. The storage connector SCON may receive the third power P3 from the backplane 130 and may exchange the third signal S3 with the backplane 130, etc.

The storage controller SCTL may control overall operations of the first storage device 141. The storage controller SCTL may include the shared register "R", but is not limited thereto. The storage controller SCTL may store information received from the backplane 130 through the storage connector SCON, for example, address information, etc., in the shared register "R".

The storage controller SCTL may write data in the storage circuit SC in response to a write request transferred from the first processor 111 and/or the second processor 112 through the backplane 130, etc. The storage controller SCTL may read data from the storage circuit SC in response to a read request transferred from the first processor 111 and/or the second processor 112 through the backplane 130, etc.

The storage controller SCTL may perform address translation. For example, the write request and/or the read request (e.g., memory access operation, etc.) transferred from the first processor 111 and/or the second processor 112 through the backplane 130 may be based on logical addresses. The storage controller SCTL may translate the logical addresses transferred from the first processor 111 and/or the second processor 112 through the backplane 130 into physical addresses of the storage circuit SC, etc.

The storage controller SCTL may perform various background operations for managing the storage space of the storage circuit SC. For example, the storage controller SCTL may perform at least one of various background operations, such as garbage collection, read reclaim, read retry, and/or wear leveling, etc.

The storage controller SCTL may operate based on the third power P3 received from the backplane 130 through the storage connector SCON. The storage controller SCTL may charge the capacitor "C" based on the third power P3 received from the backplane 130 through the storage connector SCON.

The storage circuit SC may include a nonvolatile memory NVM and/or a dynamic random access memory DRAM, etc., but is not limited thereto. The storage controller SCTL may perform memory access operations, e.g., write data write-requested by the first processor 111 and/or the second processor 112 in the nonvolatile memory NVM and/or read data from the nonvolatile memory NVM requested by the first processor 111 and/or the second processor 112, etc. The nonvolatile memory NVM may include at least one of various nonvolatile memories, such as a flash memory, a phase-change memory, a ferroelectric memory, a magnetic memory, and/or a resistive memory, etc.

The storage controller SCTL may use the dynamic random access memory DRAM for at least one of various purposes, such as a working memory, a cache memory, and/or a buffer memory, etc., for the nonvolatile memory NVM. For example, the storage controller SCTL may load and use a mapping table, which maps logical addresses to physical addresses, to the dynamic random access memory DRAM, but is not limited thereto. The storage controller SCTL may buffer data to be written in the nonvolatile memory NVM and/or data read from the nonvolatile memory NVM by using the dynamic random access memory DRAM, but is not limited thereto.

During the initialization period of the battery module 150, for example, when a power is first supplied through the power port PP, the storage controller SCTL may record information, such as at least one of the device type information DT, the voltage level information VTG, the status information SI, and/or the time information TI, etc., at the shared register "R" of the battery module 150 through the backplane 130. By accessing the shared register "R" of the battery module 150, the storage controller SCTL may notify the battery module 150 that the fourth power P4 is supplied to the power port PP of the first storage device 141.

When the sudden power off (SPO) event occurs, the storage controller SCTL may perform the power off sequence using the power charged in the capacitor "C" and the fourth power P4 supplied through the power port PP. For example, the power off sequence may include writing (e.g., backing up) data stored (e.g., buffered) in the dynamic random access memory DRAM in the nonvolatile memory NVM, but is not limited thereto. As another example, the power off sequence may include writing (e.g., backing up) the mapping table loaded to the dynamic random access memory DRAM in the nonvolatile memory NVM, etc.

Figure 4:
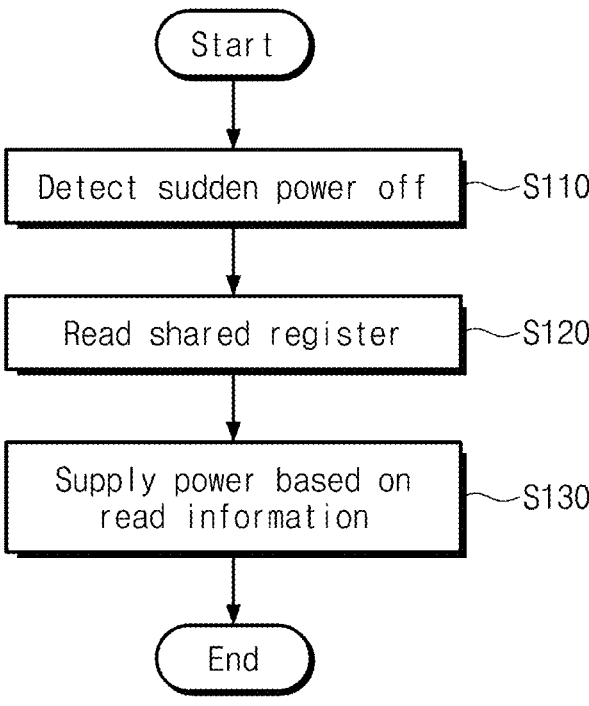
FIG. 4 illustrates an example in which a battery module operates when a sudden power off (SPO) event occurs according to at least one example embodiment.

FIG. 4 illustrates an example in which the battery module 150 operates when the sudden power off (SPO) event occurs. Referring to FIGS. 1, 2, and 4, in operation S110, the battery module 150 may detect the sudden power off (SPO) event. For example, as a voltage of the third power P3 decreases, the battery module 150 may determine that the SPO event occurs. Additionally, and/or alternatively, when a signal indicating that the SPO event occurs is received from the backplane 130, the battery module 150 may determine that the SPO event occurs.

In operation S120, the battery module 150 may read the shared register "R" of the battery module 150. For example, the battery module 150 may read the device type information DT, the voltage level information VTG, the status information SI, and/or the time information TI of each of devices connected to the backplane 130, e.g., the first to fourth storage devices 141 to 144, etc., which are stored in the shared register "R".

In operation S130, the battery module 150 may supply power based on the read information. For example, the battery module 150 may supply the fourth power P4 of 3.3 V to the first storage device 141 during a time corresponding to the time information TI whose value is "1", but the example embodiments are not limited thereto. The battery module 150 may supply the fourth power P4 of 5 V to the second storage device 142 during a time corresponding to the time information TI whose value is "1", etc. The battery module 150 may supply the fourth power P4 of 3.3 V to the third storage device 143 during a time corresponding to the time information TI whose value is "2", etc. The battery module 150 may supply the fourth power P4 of 5 V to the fourth storage device 144 during a time corresponding to the time information TI whose value is "2", etc.

In at least one example embodiment, the battery module 150 may adjust a time during which the fourth power P4 is supplied based on the status information SI. For example, when the status information SI of a specific storage device indicates the invalid value "I", an internal auxiliary power of the specific storage device may be insufficient to perform the power off sequence, but the example embodiments are not limited thereto.

The battery module 150 may supply the fourth power P4 to the specific storage device during a time corresponding to k times the time information TI (k being a positive integer), but the example embodiments are not limited thereto. For example, the third and fourth storage devices 143 and 144 may have the invalid value "I" as the status information SI. The battery module 150 may supply the fourth power P4 to the third and fourth storage devices 143 and 144 during a time corresponding to the time information TI whose value is "2k" being k times the time information TI whose value is "2", but is not limited thereto.

Figure 5:
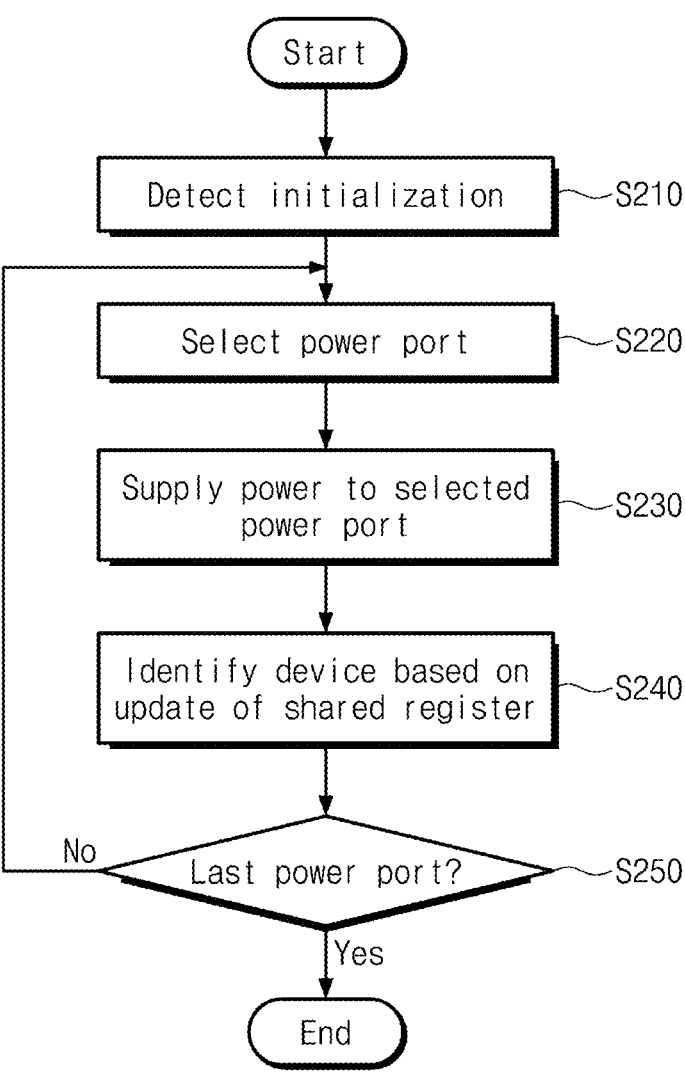
FIG. 5 illustrates an example in which a battery module identifies devices connected to a backplane and connected to a power ports according to at least one example embodiment.

FIG. 5 illustrates an example in which the battery module 150 identifies devices connected to the backplane 130 and connected to the power ports PP. Referring to FIGS. 1, 2, and 5, in operation S210, the battery module 150 may detect the initialization of the electronic device 100. For example, the initialization of the electronic device 100 may be performed by the first processor 111 and/or the second processor 112 when a power is supplied to the electronic device 100, etc. When the initialization of the electronic device 100 is completed, the first to fourth storage devices 141 to 144 and the battery module 150 may be capable of communicating with each other through the backplane 130, but the example embodiments are not limited thereto.

When the initialization of the electronic device 100 is completed, the battery module 150 may perform the initialization of the battery module 150, for example, the initialization of the second auxiliary power, etc. The initialization of the second auxiliary power may be performed through operation S320 to operation S350 as discussed in connection with FIG. 6.

Referring back to FIG. 5, in operation S220, the battery module 150 may select one of the power ports PP. In operation S230, the battery module 150 may supply a power to the selected power port. For example, the battery module 150 may supply the fourth power P4 whose voltage level is set to an initial value to the selected power port, but the example embodiments are not limited thereto. The initial value may be set in the process of manufacturing the battery module 150 and/or may be set by the first processor 111 and/or the second processor 112, an operating system, device drivers for the battery module, etc.

In operation S240, the battery module 150 may identify a device based on the updated (and/or changed) information stored in the shared register "R". For example, the battery module 150 may identify a device that is connected to the backplane 130 and corresponds to the selected power port. For example, when a specific address of the shared register "R" is updated through the backplane 130, the battery module 150 may relate the updated address (e.g., as the device identifiers DI) to the selected power port.

In operation S250, the battery module 150 may determine whether the selected power port is the last power port. When the selected power port is the last power port, that is, when the initialization of the second auxiliary power has been completed with regard to all of the power ports, the battery module 150 may end the initialization of the second auxiliary power. When the selected power port is not the last power port, that is, when the initialization of the second auxiliary power has not been completed with regard to all of the power ports, the battery module 150 may perform the initialization of the second auxiliary power with respect to a next power port as discussed in operation S220 to operation S240, but the example embodiments are not limited thereto.

Figure 6:
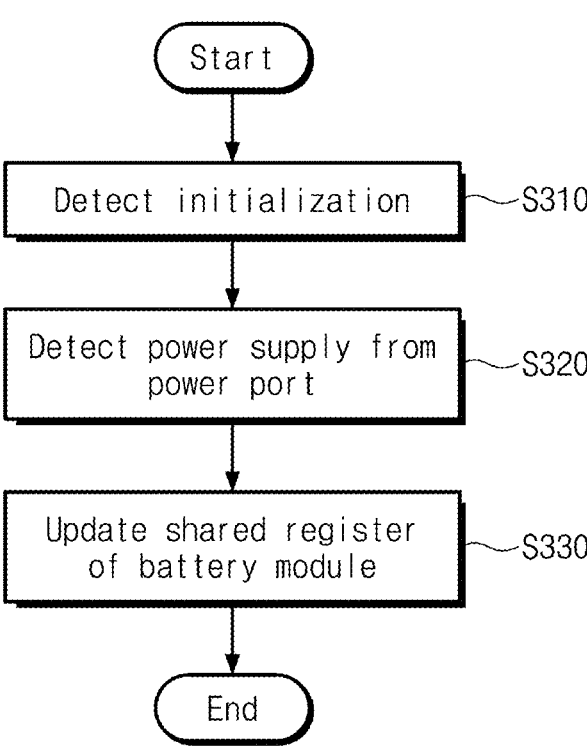
FIG. 6 illustrates an example of a method in which each of first to fourth storage devices operates depending on initialization by a battery module according to at least one example embodiment.

FIG. 6 illustrates an example of a method in which each of the first to fourth storage devices 141 to 144 operates depending on the initialization by the battery module 150, but the example embodiments are not limited thereto. Referring to FIGS. 1, 2, and 6, in operation S310, the battery module 150 may detect the initialization of the electronic device 100. For example, the initialization of the electronic device 100 may be performed by the first processor 111 and/or the second processor 112 when a power is supplied to the electronic device 100, etc. When the initialization of the electronic device 100 has been completed, the first to fourth storage devices 141 to 144 and the battery module 150 may be capable of communicating with each other through the backplane 130, etc.

In operation S320, at least one storage device among the first to fourth storage devices 141 to 144 may detect and/or receive the power supply from the power port PP. For example, the at least one storage device among the first to fourth storage devices 141 to 144 may detect that the fourth power P4 is input to the power port PP through a separate wire separated from the backplane 130, but the example embodiments are not limited thereto.

When the power supply from the power port PP is detected, in operation S330, the at least one storage device among the first to fourth storage devices 141 to 144 may update the shared register "R" of the battery module 150.

For example, the at least one storage device among the first to fourth storage devices 141 to 144 may record at least one or all of the device type information DT, the voltage level information VTG, the status information SI, and/or the time information TI, etc., at the shared register "R" of the battery module 150.

As another example, during the initialization of the battery module 150, the at least one storage device among the first to fourth storage devices 141 to 144 may record information at the shared register "R" of the battery module 150 which indicates that the fourth power P4 is supplied from the power port PP. After the initialization of the battery module 150 has been completed, the at least one storage device among the first to fourth storage devices 141 to 144 may record at least one or all of the device type information DT, the voltage level information VTG, the status information SI, and/or the time information TI, etc., at the shared register "R" of the battery module 150.

In at least one example embodiment, during the initialization of the electronic device 100, the first processor 111 and/or the second processor 112, etc., may collect a list of the first to fourth storage devices 141 to 144 and the battery module 150, which are connected to the backplane 130. The first processor 111 and/or the second processor 112 may divide the storage space of the shared register "R" of the battery module 150 so as to respectively correspond to the first to fourth storage devices 141 to 144, and may allocate the divided storage spaces to the first to fourth storage devices 141 to 144, etc., but the example embodiments are not limited thereto. Each of the first to fourth storage devices 141 to 144 may store information in the allocated storage space among the divided storage spaces of the shared register "R" of the battery module 150, but are not limited thereto.

Figure 7:
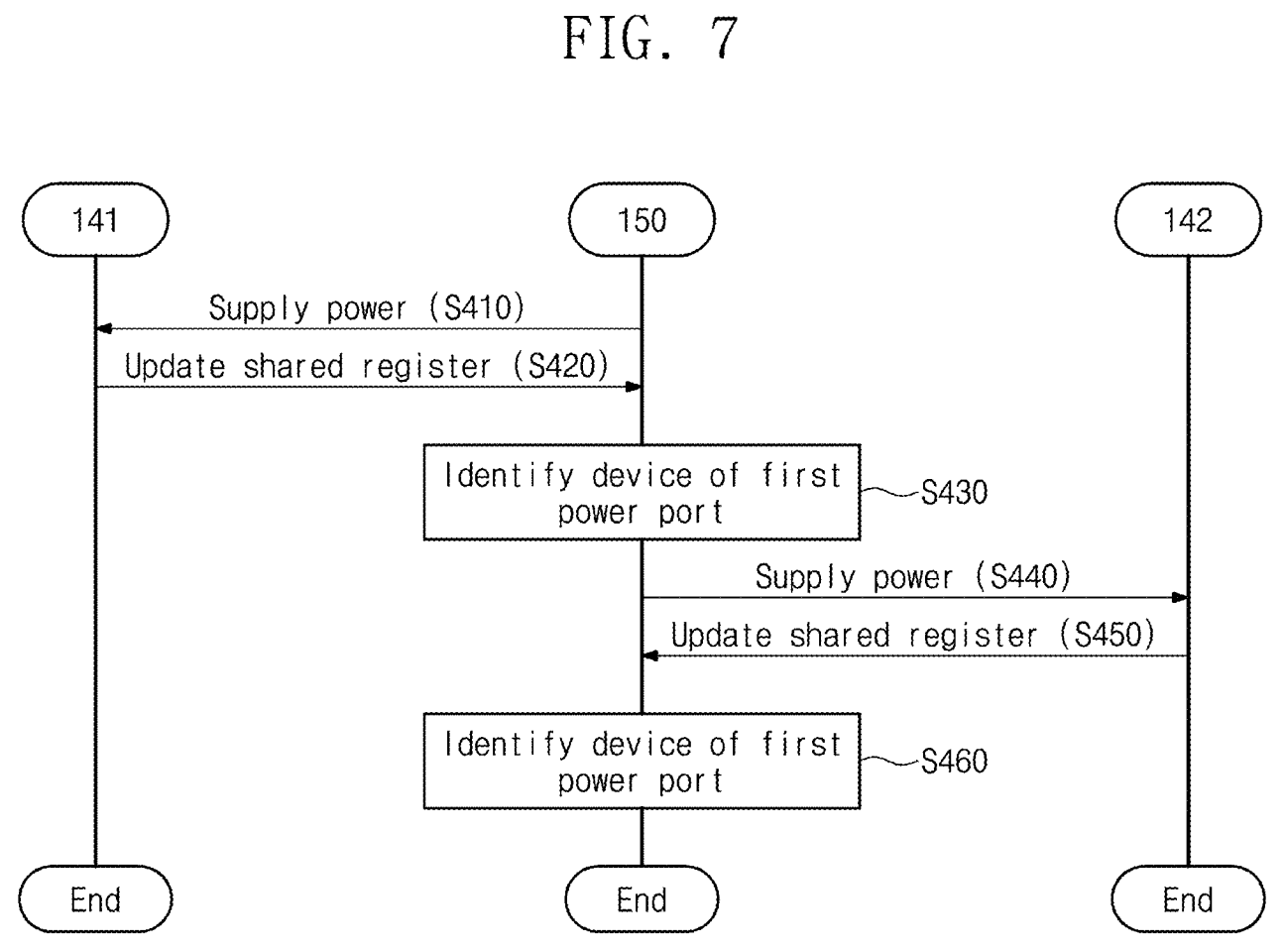

FIG. 7 illustrates an example of a method in which the battery module 150 identifies the first storage device 141 and the second storage device 142, but the example embodiments are not limited thereto. Referring to FIGS. 1, 2, and 7, in operation S410, the battery module 150 may supply a power to the first storage device 141 through the power port PP. For example, the battery module 150 may supply the power through a first power port among the power ports PP, but is not limited thereto.

In operation S420, the first storage device 141 may update the shared register "R" of the battery module 150. As the shared register "R" is updated, in operation S430, the battery module 150 may identify a device connected to the first power port. For example, the battery module 150 may identify information (e.g., the device type information DT and/or the status information SI, etc.) of the first storage device 141 connected to the first power port and information (e.g., the voltage level information VTG and/or the time information TI, etc.) about supply of the second auxiliary power corresponding to the SPO of the first storage device 141, but the example embodiments are not limited thereto.

In operation S440, the battery module 150 may supply a power to the second storage device 142 through the power port PP. For example, the battery module 150 may supply the power through a second power port among the power ports PP, etc.

In operation S450, the second storage device 142 may update the shared register "R" of the battery module 150. As the shared register "R" is updated, in operation S460, the battery module 150 may identify a device connected to the second power port, etc. For example, the battery module 150 may identify information (e.g., the device type information DT and/or the status information SI, etc.) of the second storage device 142 connected to the second power port and information (e.g., the voltage level information VTG and/or the time information TI, etc.) regarding the supply of the second auxiliary power corresponding to the SPO of the second storage device 142, but is not limited thereto.

As in the above description, the battery module 150 may identify information (e.g., the device type information DT and/or the status information SI, etc.) of the third storage device 143 and information (e.g., the voltage level information VTG and/or the time information TI, etc.) regarding the supply of the second auxiliary power corresponding to the SPO of the third storage device 143, etc. Also, the battery module 150 may identify information (e.g., the device type information DT and/or the status information SI, etc.) of the fourth storage device 144 and information (e.g., the voltage level information VTG and/or the time information TI, etc.) regarding the supply of the second auxiliary power corresponding to the SPO of the fourth storage device 144, etc.

FIG. 8 illustrates an example in which at least one of the first to fourth storage devices 141 to 144 adjusts the time information TI, but the example embodiments are not limited thereto. Referring to FIGS. 1, 2, 3, and 8, in operation S510, at least one storage device among the first to fourth storage devices 141 to 144, etc., may determine whether the amount of backup data (e.g., the amount of data to backup, etc.) increases. For example, the backup data may be data that is stored in the dynamic random access memory DRAM of the storage circuit SC and should be written to (e.g., backed up to) the nonvolatile memory NVM when the SPO event occurs, but the example embodiments are not limited thereto.

When the amount of backup data increases, a time desired and/or necessary for writing the backup data in the nonvolatile memory NVM may increase. Accordingly, in operation S520, the one storage device among the first to fourth storage devices 141 to 144 may increase the time information TI stored in the shared register "R" of the battery module 150.

When the backup data does not increase, the at least one storage device among the first to fourth storage devices 141 to 144 may determine whether the amount of backup data decreases. When the amount of backup data decreases, a time desired and/or necessary for writing the backup data in the nonvolatile memory NVM may decrease. Accordingly, in operation S540, the at least one storage device among the first to fourth storage devices 141 to 144 may decrease the time information TI stored in the shared register "R" of the battery module 150.

When the amount of backup data does not decrease, the amount of backup data may be maintained. Accordingly, a time desired and/or necessary for writing the backup data in the nonvolatile memory NVM may be maintained. When the amount of backup data does not decrease, in operation S550, the one storage device among the first to fourth storage devices 141 to 144 may maintain the time information TI stored in the shared register "R" of the battery module 150 without change.

In at least one example embodiment, the one storage device among the first to fourth storage devices 141 to 144 may perform the adjustment of the time information TI of FIG. 8 periodically based on a specific and/or desired time period. As another example, when the amount of backup data changes as much as a specific unit (e.g., the amount of data to backup exceeds a desired backup threshold value, etc.), the at least one storage device among the first to fourth storage devices 141 to 144 may increase the time information TI (operation S520), maintain the time information TI, or may decrease the time information TI (operation S540), etc.

In one or more of the above example embodiments, the description is given as the device type information DT, the voltage level information VTG, the status information SI, and/or the time information TI, etc., are recorded at the shared register "R" of the battery module 150. However the at least one storage device among the first to fourth storage devices 141 to 144 may record additional information for supply of the second auxiliary power at the shared register "R" of the battery module 150, etc.

For example, the at least one storage device among the first to fourth storage devices 141 to 144 may record information requesting to supply a power (e.g., a lower voltage than an operating voltage of the voltage level information VTG, etc.) desired and/or necessary in a low-voltage mode at the shared register "R" of the battery module 150, but the example embodiments are not limited thereto. When the SPO event occurs, the corresponding storage device may operate in the low-power mode based on the second auxiliary power supplied through the power port PP, etc. While in the low-power mode, the power may be supplied to only some of the components of the storage controller SCTL, and the power may not be supplied to the other components, etc., to conserve power.

As another example, the at least one storage device among the first to fourth storage devices 141 to 144 may record information requesting to supply a high power for overclocking (e.g., a higher voltage than an operating voltage of the voltage level information VTG, etc.) at the shared register "R" of the battery module 150. When the SPO event occurs, the corresponding storage device may enter an overclocking mode based on the second auxiliary power supplied through the power port PP. While in the overclocking mode, the corresponding storage device may quickly write the backup data into the nonvolatile memory NVM, etc.

As another example, the at least one storage device among the first to fourth storage devices 141 to 144 may record information requesting to supply the high power for overclocking during a first time period and to then supply the power desired and/or necessary in the low-power mode at the shared register "R" of the battery module 150. When the SPO event occurs, the corresponding storage device may enter the overclocking mode during the first time period. While in the overclocking mode, the corresponding storage device may quickly write the backup data into the nonvolatile memory NVM, etc. Afterwards, the corresponding storage device may operate in the low-power mode, etc.

Figure 9:
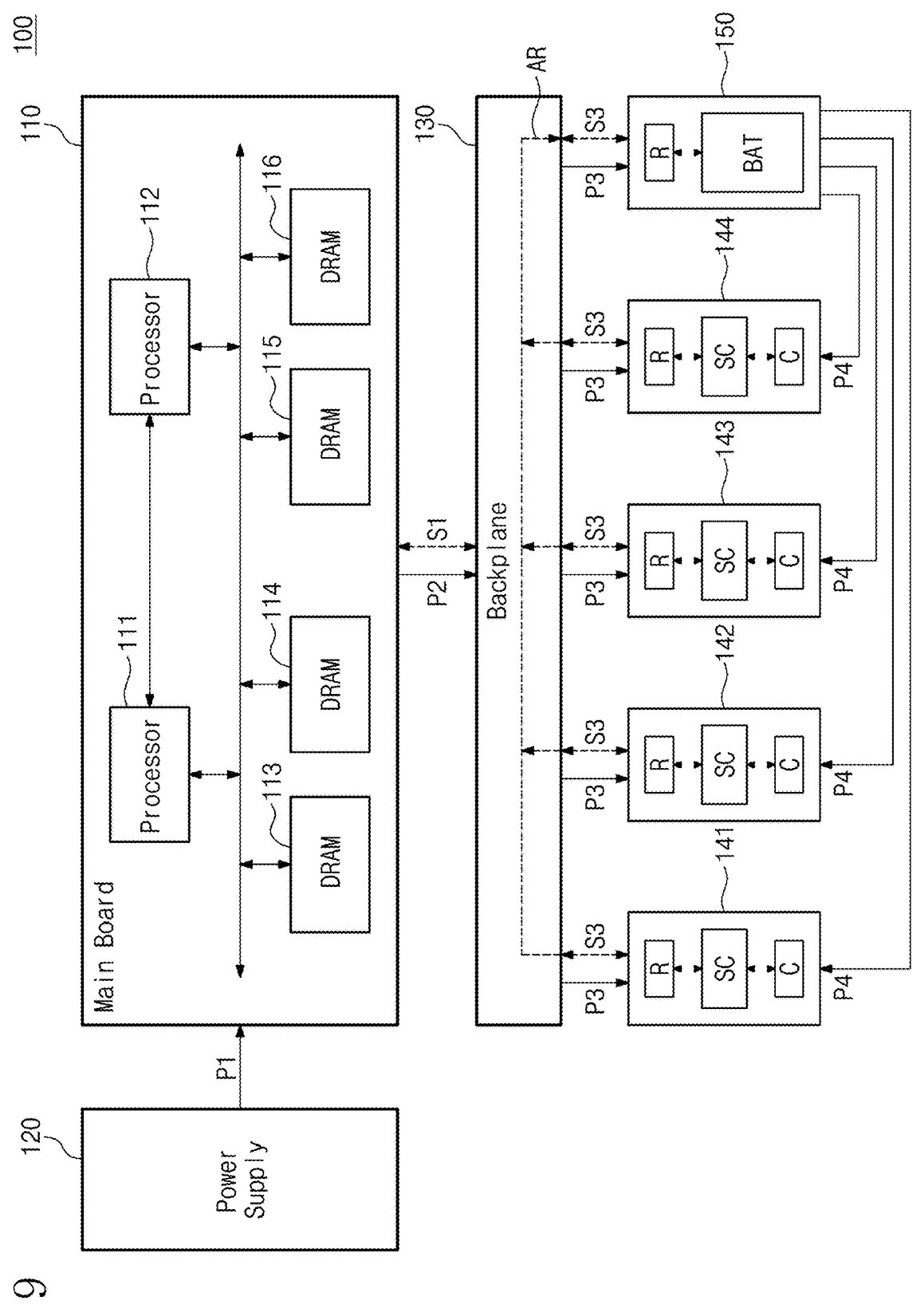
FIG. 9 illustrates an example in which a battery module and first to fourth storage devices connected to a backplane are included in an SPO protection system, in an electronic device according to at least one example embodiment.

FIG. 9 illustrates an example in which the battery module 150 and the first to fourth storage devices 141 to 144 connected to the backplane 130 are included in an SPO protection system in the electronic device 100 according to at least one example embodiment. Referring to FIG. 9, as shown by an arrow AR, the first to fourth storage devices 141 to 144 may record pieces of device information and information about supply of the second auxiliary power in the SPO event at the shared register "R" of the battery module 150 through the backplane 130, but the example embodiments are not limited thereto.

The battery module 150 may supply the second auxiliary power to the first to fourth storage devices 141 to 144 through separate wires, power connections, and/or power circuitry, etc., separated from the backplane 130 based on the information recorded at the shared register "R". That is, without intervention of components on the top of the backplane 130, for example, the first processor 111 and/or the second processor 112, etc., the first to fourth storage devices 141 to 144 and the battery module 150 may set a policy for the SPO event and may adaptively adjust the policy. Accordingly, without the overhead of the components on the top of the backplane 130, the first to fourth storage devices 141 to 144 and the battery module 150 may cope with the SPO event appropriately.

In at least one example embodiment, the battery module 150 may supply the second auxiliary power to power wires, power connections, and/or power circuitry of the backplane 130, not using separate wirings, etc. When the SPO event occurs, the second auxiliary power of the battery module 150 is provided to the first to fourth storage devices 141 to 144 through the power wires of the backplane 130 based on the information recorded at the shared register "R". Accordingly, without the overhead of the components on the top of the backplane 130 and without having separate wiring, etc., for supplying the second auxiliary power, the first to fourth storage devices 141 to 144 and the battery module 150 may cope with and/or handle the SPO event appropriately without the SPO event damaging the components of the backplane 130, e.g., the first to fourth storage devices 141 to 144 and/or the battery module 150, etc.

Figure 10:
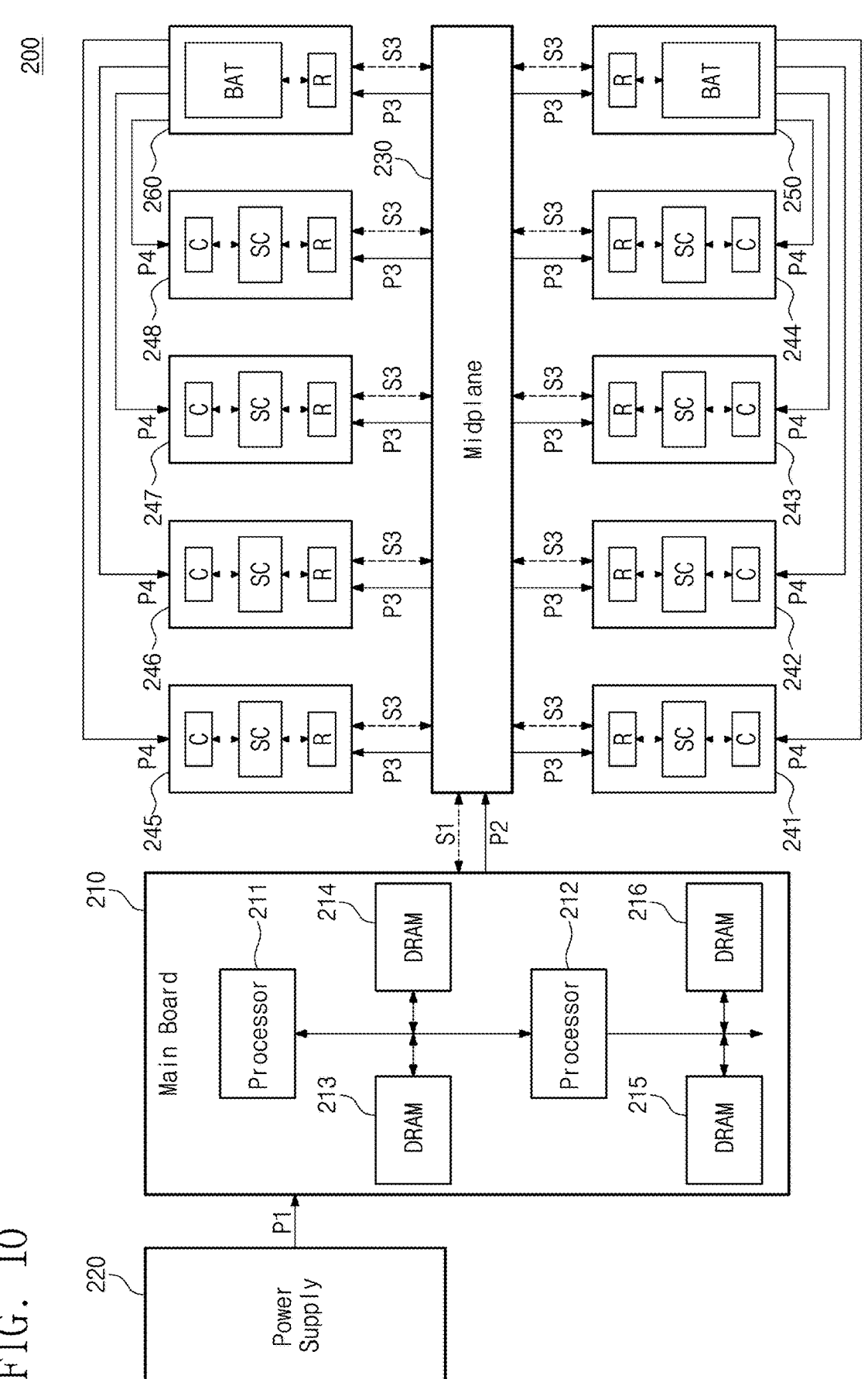
FIG. 10 illustrates an electronic device according to at least one example embodiment of the inventive concepts.

FIG. 10 is a diagram illustrating an electronic device 200 according to at least one example embodiment of the inventive concepts. Referring to FIG. 10, the electronic device 200 may include a main board 210, a power supply 220, a midplane 230, first to eighth storage devices 241 to 248, a first battery module 250, and/or a second battery module 260, etc., but the example embodiments are not limited thereto, and for example, the electronic device 200 may include a greater or lesser number of constituent components, etc.

One or more components of the electronic device 200 may be mounted on the main board 210. For example, a first processor 211, a second processor 212, and first to fourth dynamic random access memories (DRAMs) 213 to 116 may be mounted on the main board 210, but the example embodiments are not limited thereto. The main board 210 and the components mounted on the main board 210 may be the same as the main board 110 and the components mounted on the main board 110, which are described with reference to FIG. 1, but are not limited thereto. Thus, additional description will be omitted to avoid redundancy.

The power supply 220 may receive a power from an external device and/or an external source, and may supply the first power P1 including voltages and currents appropriate for the electronic device 200 to the main board 210. The power supply 220 may be the same as the power supply 120 described with reference to FIG. 1, but is not limited thereto. Thus, additional description will be omitted to avoid redundancy.

Compared to the electronic device 100 of FIG. 1, the main board 210 of the electronic device 200 may be connected to the midplane 230, but is not limited thereto. The midplane 230 may be configured such that a plurality of electronic devices are mounted thereon, and may include a separate substrate separated from the main board 210. For example, the midplane 230 may include a plurality of connectors and may provide at least one channel between the main board 210 and components connected to the plurality of connectors, etc.

For example, the main board 210 may supply the second power P2 to the midplane 230. The main board 210 may exchange the first signal S1 with the midplane 230. For example, the first signal S1 may include at least one signal(s) that the first processor 211 and/or the second processor 212, etc., communicates with one or more components mounted on the midplane 230.

In at least one example embodiment, a first set of storage devices, e.g., the first to fourth storage devices 241 to 244, etc., and the first battery module 250 may be mounted on one side surface of the midplane 230, but the example embodiments are not limited thereto. The a second set of storage devices, e.g., the fifth to eighth storage devices 245 to 248, etc., and the second battery module 260 may be mounted on an opposite side surface of the midplane 230, etc., but the example embodiments are not limited thereto.

The midplane 230 may supply the third power P3 to the first to eighth storage devices 241 to 248, the first battery module 250, and/or the second battery module 260, etc. The midplane 230 may communicate (e.g., transmit and/or receive, etc.) the third signal S3 with the first to eighth storage devices 241 to 248, the first battery module 250, and/or the second battery module 260, etc. For example, the third signal S3 may include at least one signal(s) that the first processor 211 and/or the second processor 212 communicates with the components mounted on the midplane 230 and/or at least one signal(s) that the components mounted on the midplane 230 communicate with each other, etc.

Configurations and operations of the first to fourth storage devices 241 to 244 and the first battery module 250 may be the same as, or similar to, those of the first to fourth storage devices 141 to 144 and the battery module 150 of FIG. 1, but the example embodiments are not limited thereto. For example, the first to fourth storage devices 241 to 244 may record device-related information (e.g., the device type information DT and the status information SI) and/or supply information (e.g., the voltage level information VTG and the time information TI) of the second auxiliary power at the shared register "R" of the first battery module 250, etc. When the SPO event occurs, the first battery module 250 may supply the second auxiliary power to the first to fourth storage devices 241 to 244, based on the information stored in the shared register "R", etc.

Configurations and operations of the fifth to eighth storage devices 245 to 248 and the second battery module 260 may be the same as, or similar to, those of the first to fourth storage devices 141 to 144 and the battery module 150 of FIG. 1, but the example embodiments are not limited thereto. For example, the fifth to eighth storage devices 245 to 248 may record device-related information (e.g., the device type information DT and the status information SI) and/or supply information (e.g., the voltage level information VTG and the time information TI) of the second auxiliary power at the shared register "R" of the second battery module 260, etc. When the SPO event occurs, the second battery module 260 may supply the second auxiliary power to the fifth to eighth storage devices 245 to 248 based on the information stored in the shared register "R", etc.

According to some example embodiments of the inventive concepts, storage devices and a battery module belonging to a backplane and/or a midplane may comprise an SPO protection system. An auxiliary power supply policy of the SPO protection system may be adaptively changed depending on states of the storage devices. Accordingly, the reliability of the electronic device 100 and/or 200 is improved, etc.

In the above some example embodiments, components according to the inventive concepts are described by using the terms "first", "second", "third", etc. However, the terms "first", "second", "third", etc. may be used to distinguish components from each other and do not limit the inventive concepts. For example, the terms "first", "second", "third", etc. do not involve an order or a numerical meaning of any form.

In the above example embodiments, components according to some example embodiments of the inventive concepts are referenced as blocks. The blocks may be implemented as processing circuitry and/or other hardware devices, such as an integrated circuit, an application specific IC (ASIC), a field programmable gate array (FPGA), a complex programmable logic device (CPLD), firmware and/or driven by hardware devices, or a combination of a hardware device and software. Also, the blocks may include circuits implemented with semiconductor elements in an integrated circuit and/or circuits enrolled as an intellectual property (IP) block, etc.

According to one or more example embodiments of the inventive concepts, an electronic device that is used as a battery module may supply an auxiliary power to other electronic devices. An electronic device that is used as a storage device may access the battery module and may adjust the auxiliary power. Accordingly, an electronic device that includes the capability of independently resolving a sudden power off as components thereof is provided, and therefore the reliability of the electronic device is improved.

While various example embodiments of the inventive concepts have been described with reference to various example embodiments thereof, it will be apparent to those of ordinary skill in the art that various changes and modifications may be made thereto without departing from the spirit and scope of the inventive concepts as set forth in the following claims.

What is claimed is:

1. An electronic device comprising:
a substrate including a plurality of first connectors, at least one second connector, and a plurality of first wires connecting the plurality of first connectors and the at least one second connector;
a plurality of storage devices connected to the plurality of first connectors, each storage device of the plurality of storage devices including at least one capacitor configured to supply a first auxiliary power to a respective storage device; and
at least one battery connected to the at least one second connector, the at least one battery configured to,
receive information related to the plurality of storage devices through the plurality of first wires, and
supply a second auxiliary power to each storage device of the plurality of storage devices through a plurality of second wires not included in the substrate based on the received information in response to a detected sudden power off (SPO) event.

2. The electronic device of claim 1, wherein the plurality of storage devices are configured to communicate with the plurality of first connectors based on peripheral component interconnect express (PCIe) protocol or nonvolatile memory express (NVMe) protocol; and
the at least one battery is configured to communicate with the at least one second connector based on the PCIe protocol or the NVMe protocol.

3. The electronic device of claim 2, wherein the at least one battery is configured to:
store the information related to the plurality of storage devices at a base address register (BAR).

4. The electronic device of claim 1, wherein the plurality of second wires are separate from the plurality of first wires.

5. The electronic device of claim 4, wherein the at least one battery is configured to:
supply the second auxiliary power through one second wire among the plurality of second wires; and
identify a connected storage device of the plurality of storage devices connected to the one second wire based on a signal received from the connected storage device.

6. The electronic device of claim 5, wherein the signal received from the connected storage device includes voltage level information regarding an operating voltage of the connected storage device.

7. The electronic device of claim 6, wherein the at least one battery is configured to:
adjust a voltage level of the second auxiliary power supplied to the connected storage device based on the voltage level information of the connected storage device.

8. The electronic device of claim 5, wherein the signal received from the connected storage device includes information indicating whether to supply the second auxiliary power to the connected storage device.

9. The electronic device of claim 5, wherein
the signal received from the connected storage device includes information regarding the at least one capacitor of the connected storage device.

10. The electronic device of claim 9, wherein the connected storage device is configured to transmit an updated signal to the at least one battery in response to a change in status information of the connected storage device, the updated signal indicating the change in the status information.

11. The electronic device of claim 5, wherein the signal received from the connected storage device includes time information indicating a time for receiving the second auxiliary power.

12. The electronic device of claim 11, wherein the at least one battery is configured to supply the second auxiliary power to the connected storage device at the time indicated by the time information in response to the SPO event being detected.

13. The electronic device of claim 11, wherein the connected storage device is configured to transmit an updated signal indicating a change of the time information to the at least one battery in response to the time information of the connected storage device being changed.

14. The electronic device of claim 1, wherein the substrate is at least one of a backplane or a midplane.

15. An electronic device comprising:
a plurality of power ports;
a controller including a shared register, the shared register configured to store information received from an external substrate, the information including a device type information for each device of a plurality of devices connected to the external substrate and a power port identifier associated with each device of the plurality of devices, the power port identifier indicating a power port of the plurality of power ports to which a respective device is connected;
a battery; and
the controller is configured to supply auxiliary power from the battery to the plurality of power ports based on the device type information and the power port identifier for each device of the plurality of devices stored in the shared register in response to a sudden power off (SPO) event being detected.

16. The electronic device of claim 15, wherein the plurality of power ports are configured to be connected to wires separate from the external substrate.

17. The electronic device of claim 15, wherein the battery is configured to be charged by power received from the external substrate.

18. An electronic device comprising:
a controller including a shared register, the shared register configured to store information received from an external substrate, the controller connected to the external substrate through at least one first wire of a plurality of first wires, the plurality of first wires included in the external substrate;

at least one nonvolatile memory device configured to store data received from the external substrate through the at least one first wire of the plurality of first wires;

at least one capacitor configured to supply a first auxiliary power to the controller and the at least one nonvolatile memory device in response to a sudden power off (SPO) event being detected;

at least one power port configured to receive a second auxiliary power supplied to the controller and the at least one nonvolatile memory device through a plurality of second wires not included in the external substrate in response to the SPO event being detected; and the controller is configured to adjust the second auxiliary power received through the at least one power port by transmitting the information via the at least one first wire through the external substrate.

19. The electronic device of claim 18, wherein the controller is configured to:

determine whether to receive the second auxiliary power based on a current charge state of the at least one capacitor; and adjust the second auxiliary power based on results of the determination.

20. The electronic device of claim 18, wherein the controller is configured to:

adjust a time of receiving the second auxiliary power based on a current charge state of the at least one capacitor.

\* \* \* \* \*